(12) United States Patent
Knorr et al.

(10) Patent No.: US 6,690,133 B2
(45) Date of Patent: Feb. 10, 2004

(54) MOMENTUM-DECOUPLED DRIVE TRAIN

(75) Inventors: Markus Knorr, München (DE); Dietmar Stoiber, Fürth (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/975,546

(22) Filed: Oct. 11, 2001

(65) Prior Publication Data

US 2002/0145398 A1 Oct. 10, 2002

(30) Foreign Application Priority Data

Apr. 6, 2001 (DE) .......................................... 101 17 460

(51) Int. Cl.⁷ .............................................. G05B 11/01
(52) U.S. Cl. ........................ 318/560; 318/433; 318/280
(58) Field of Search ................................. 318/560, 432, 318/280, 254, 138, 799, 433

(56) References Cited

U.S. PATENT DOCUMENTS

| 5,214,361 A | * | 5/1993 | Labruyere | .................. | 318/560 |
| 5,428,285 A | * | 6/1995 | Koyama et al. | ............ | 318/799 |
| 6,377,010 B1 | * | 4/2002 | Roither | ........................ | 318/560 |
| 6,459,225 B1 | * | 10/2002 | Maruyama | .................. | 318/560 |

FOREIGN PATENT DOCUMENTS

DE          198 10 996 A1          9/1999

* cited by examiner

Primary Examiner—Robert Nappi
Assistant Examiner—Renata McCloud
(74) Attorney, Agent, or Firm—Henry M. Feiereisen

(57) ABSTRACT

A momentum-decoupled drive train for a machine, includes a servo motor, a first drive element and a second drive element. The second drive element is movably supported relative to a machine bed in a movement direction of a machine carriage. Reaction forces which are caused by the movement of the machine carriage, are compensated by a corresponding counter movement of the second drive element or a reaction carriage connected thereto, and hence are not transferred to the machine bed. The position of the machine carriage relative to the machine bed is controlled by correcting the position setpoint value with actual position and velocity data for the reaction carriage relative to the machine bed.

7 Claims, 2 Drawing Sheets

MOMENTUM-DECOUPLED DRIVE TRAIN

CROSS-REFERENCES TO RELATED APPLICATIONS

This application claims the priority of German Patent Application, Serial No. 101 17 460.8, filed Apr. 6, 2001, the subject matter of which is incorporated herein by reference.

BACKGROUND OF THE INVENTION

The invention relates to a drive train for a machine tool or useful load, and more particular to a drive train with two drive elements, wherein one drive element is moveably supported on a machine base.

Many industrial production processes employ machines that move workpieces and/or tools along defined pathways in axial directions. The operating speed of these machines depends on the velocity of both the feed motion and transport motion. Accordingly, a high axial velocity is desirable for achieving a high machine productivity.

Most frequently, precisely controlled electrical servo drives provide the feed motion. Unless these drives are direct drives, various drive elements, such as ball roller spindles, toothed belts or toothed racks, are used to transmit the torque of the servo motor to the machine carriage which moves in a linear direction. Such drive systems are widely used in industrial applications.

High linear velocities are inevitably accompanied by large accelerations and noticeable jolts (sudden change in the acceleration per unit time). In particular, jolts become stronger with increasing operating speed along the servo axis. The jolts induce oscillations in the machine structure which adversely affect the precision and the contour accuracy of the manufacturing process. It is therefore frequently necessary to reduce the acceleration and the axial speed so as not to exceed certain critical parameters that tend to produce jolts. Limiting the axial speed, however, impairs the productivity of the machine.

The reaction forces produced by the drive train can cause oscillations in the machine which can make it impossible to maintain the desired precision. In this case, the axial velocity should be decreased, or the machine design should be changed to mechanically strengthen the machine. As mentioned above, reducing the axial speed lowers the productivity which is undesirable in most situations. Increasing the mechanical rigidity of the machine can also be quite expensive and therefore negate the advantages originally envisioned for the machine. More particularly, mechanical reinforcement may not even be an option when the mechanical load exceeds a predetermined value.

German Pat. No. DE-A-198 10 996 describes a method for keeping away from the machine base the recoil moment generated by directly driven servo axes. As described in the reference, a direct drive system always produces two forces, namely the desired thrust which drives the machine carriage, and the reaction force produced as a result of the thrust. Both forces—the thrust and the reaction force—are always produced simultaneously, have always the same magnitude and are oriented in opposite directions. However, both forces can act on different locations and/or machine elements. This arrangement reflects the physical law of momentum conservation. The machine operator desires only a single force, namely the drive force, which accelerates a machine carriage along the path contour. The second force, the reaction force, cannot be eliminated due to the laws of momentum conservation, but does not contribute to the machine operation and is therefore wasted. German Pat. No. DE-198 10 996 teaches a method for diverting the reaction force before it reaches the machine base, which can still produce undesirable effects. The method described in the reference does not alter the control functions and is therefore limited to direct drives, such as linear motors, which operate without a mechanical transmission or idlers.

It would therefore be desirable to prevent transmission of vibrations which are produced as a result of the reaction forces by the fast axial drives to the machine base. It would also be desirable to It would be desirable to operate the machine at a high linear speed without causing the machine to oscillate.

SUMMARY OF THE INVENTION

According to one aspect of the present invention, a drive for a useful load in an machine includes a motor and a drive assembly having at least a first and a second drive element which are in mutual engagement for moving to the useful load. The first drive element is associated with the useful load, whereas the second drive element is connected to a stationary base. The second drive element is movably supported on the base. In this way, the reaction force can be decoupled from the machine base even if the drive system is not a direct drive. In other words, the recoil momentum can be decoupled from the machine base even when using the more common spindle drives, belt drives and rack and pinion drives.

Embodiments of the invention may include one or several of the following features. The first drive element can be connected with a machine carriage, and the second drive element can be connected to a reaction carriage that is supported on the machine base. The drive may also include a first positioning measurement device for measuring the position of the machine carriage relative to the reaction carriage, which can be resiliently supported on the machine base, and a second positioning measurement device for determining the position of the reaction carriage relative to the machine base. One of the positioning measurement devices may include an angular encoder associated with a servo motor.

Moreover, the system may include a control system for controlling the position of the useful load, wherein the characteristic frequency of the reaction carriage when oscillating in the direction of motion is smaller than the control frequency of the control system. The characteristic frequency should be at most 400 Hz, preferably less than 100 Hz, and more particularly less than 30 Hz. The drive element may include a pinion and a toothed rod, a spindle and a spindle nut, a belt pulley and a drive belt, or a pinion and a drive chain.

According to another aspect of the invention, a method for controlling the drive system includes presetting setpoint position data for the useful load and correcting the setpoint position data with actual position data reflecting the position of the machine carriage relative to the machine base. In particular, the method includes defining a setpoint value for a position of the machine carriage relative to a machine base, and adding a correction signal representing a displacement between the reaction carriage and the machine base to the setpoint value, thus providing a corrected setpoint value. The method further includes measuring an actual position value of the machine carriage relative to the reaction carriage, subtracting the actual position value from the corrected setpoint value, thereby forming a differentiated velocity setpoint signal, and measuring the velocity of the machine carriage relative to the reaction carriage by differentiating the actual position value. The velocity of the machine carriage is then subtracted from the differentiated velocity setpoint signal, and a control signal is fed back to a motor that controls the position of a useful load to make the difference between the velocity of the machine carriage and the differentiated velocity setpoint signal equal to zero.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
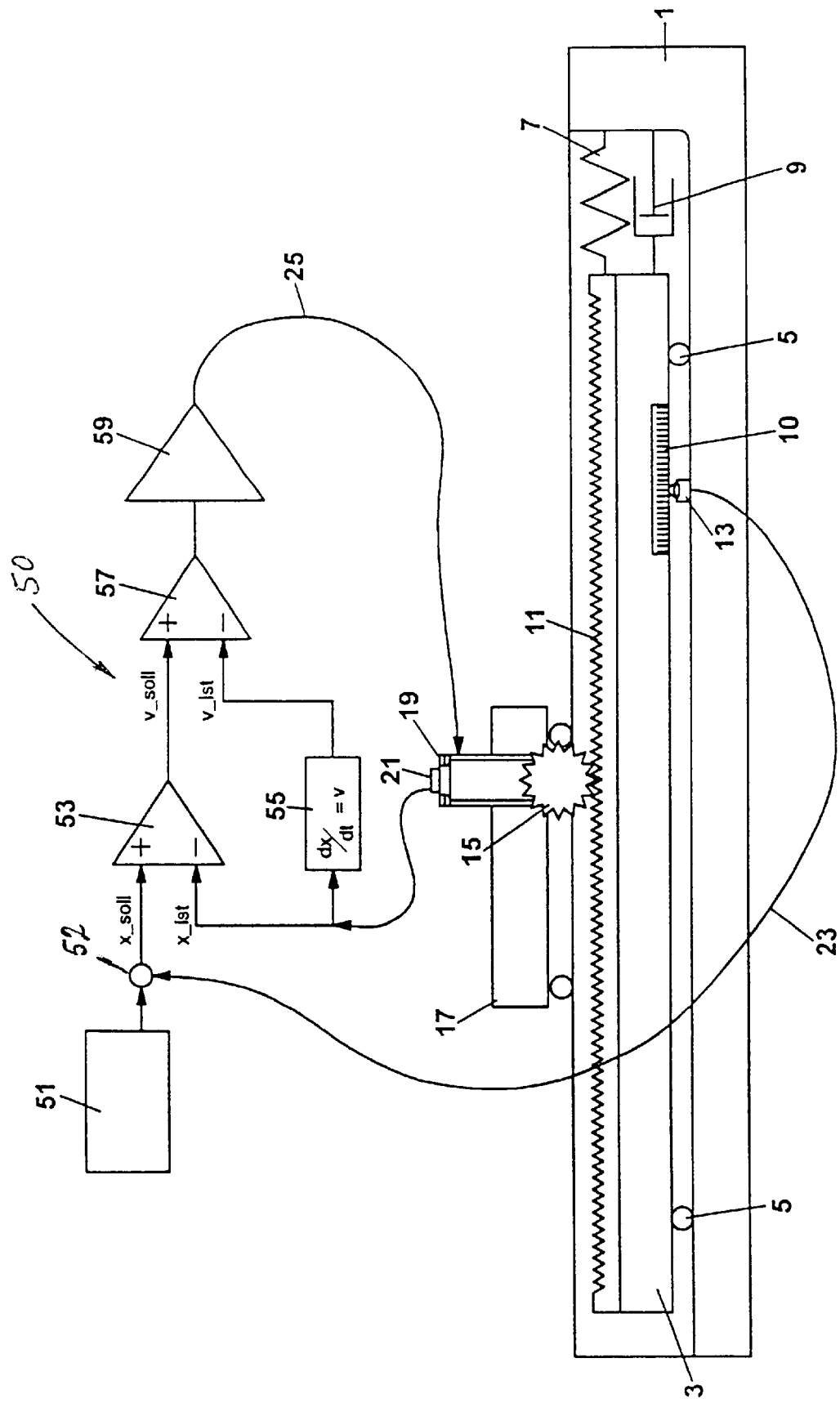
FIG. 1 shows a schematic illustration of a rack and pinion drive with a reaction carriage, embodying the present invention.

Throughout all the Figures, same or corresponding elements are generally indicated by same reference numerals.

Turning now to the drawing, and in particular to FIG. 1, there is shown a schematic illustration of a rack and pinion drive with a reaction carriage, embodying the present invention. The recoil momentum can be decoupled from the machine base by softly supporting the counter support of the drive train on a machine base 1, rather than rigidly attaching the counter support to the machine base, as is typical with conventional systems. For this purpose, an additional reaction carriage 3 is provided which is moveable relative to the machine base 1 and receives the reaction force of the drive train. For example, a toothed rod 11 is connected to the reaction carriage 3 which is in turn elastically connected to the machine base 1 by a spring 7 and a damper 9. A servo motor 19 accelerates the machine base 1 which supports a useful load, such as a tool or a workpiece (not shown), with the elastically supported reaction side of the drive performing a corresponding counter motion. The recoil from the drive is thereby diverted to the momentum of the reaction side (corresponding to the toothed rod in FIG. 1). However, the counter-motion also causes an additional change in the relative position between the reaction carriage 3 and the machine base 1. The position between the machine carriage 17 and the machine base 1 has to be controlled as accurately as possible. For this reason, the additional displacement between the reaction carriage 3 and the machine base 1 is measured and supplied as a correction value to the position control. A ruler 10 which cooperates with a sensor 13 is attached to the machine carriage, wherein the sensor 13 measures the displacement of the reaction carriage 3 relative to the machine base. A correction signal 23 is transmitted to a control system 50. Details of the control system 50 will be described in more detail below.

The reaction side 3 of the drive train has a specific mass and is elastically attached to the machine base 1 by spring 7. The reaction side 3 thus represents a system that can oscillate relative to the machine base 1. A damper 9 associated with the spring 7 is provided to prevent a resonance and to quickly attenuate any oscillations that may be excited.

Servo drive systems are known to be able to follow preset setpoint position values - depending on the system dynamics- up to frequencies of several 10 Hz. If the control values include frequency components above the frequencies which the drive system can handle, then the paths of the tool or workpiece can no longer be controlled, causing corresponding position errors. Since the correction signal from sensor 13 and supplied via line 23 resulting from the compensating motion of the reaction carriage 3 is added to the setpoint value provided by setpoint generator 51, the drive system must to be able to properly process the correction signal. For this reason, the frequencies of the correction signals should be low enough so that they can still be processed by the drive system. It would be disadvantageous to filter the correction signal, because positioning errors can arise from the associated amplitude and phase loss. Instead, physical elements should be used to eliminate the higher frequency components from the oscillation frequency of the compensating motion of the reaction carriage 3. The characteristic frequency of the reaction side 3 of the drive relative to the machine base 1 should advantageously have a small value. For this reason, as indicated schematically in FIG. 1, the movably supported toothed rod and the reaction carriage 3, respectively, should have a large inertial mass.

The motor 19 in FIG. 1 is located on the machine carriage 17. A drive shaft of the motor 19 has a pinion 15 which engages the toothed rack 11 secured to the reaction carriage 3.

Figure 2:
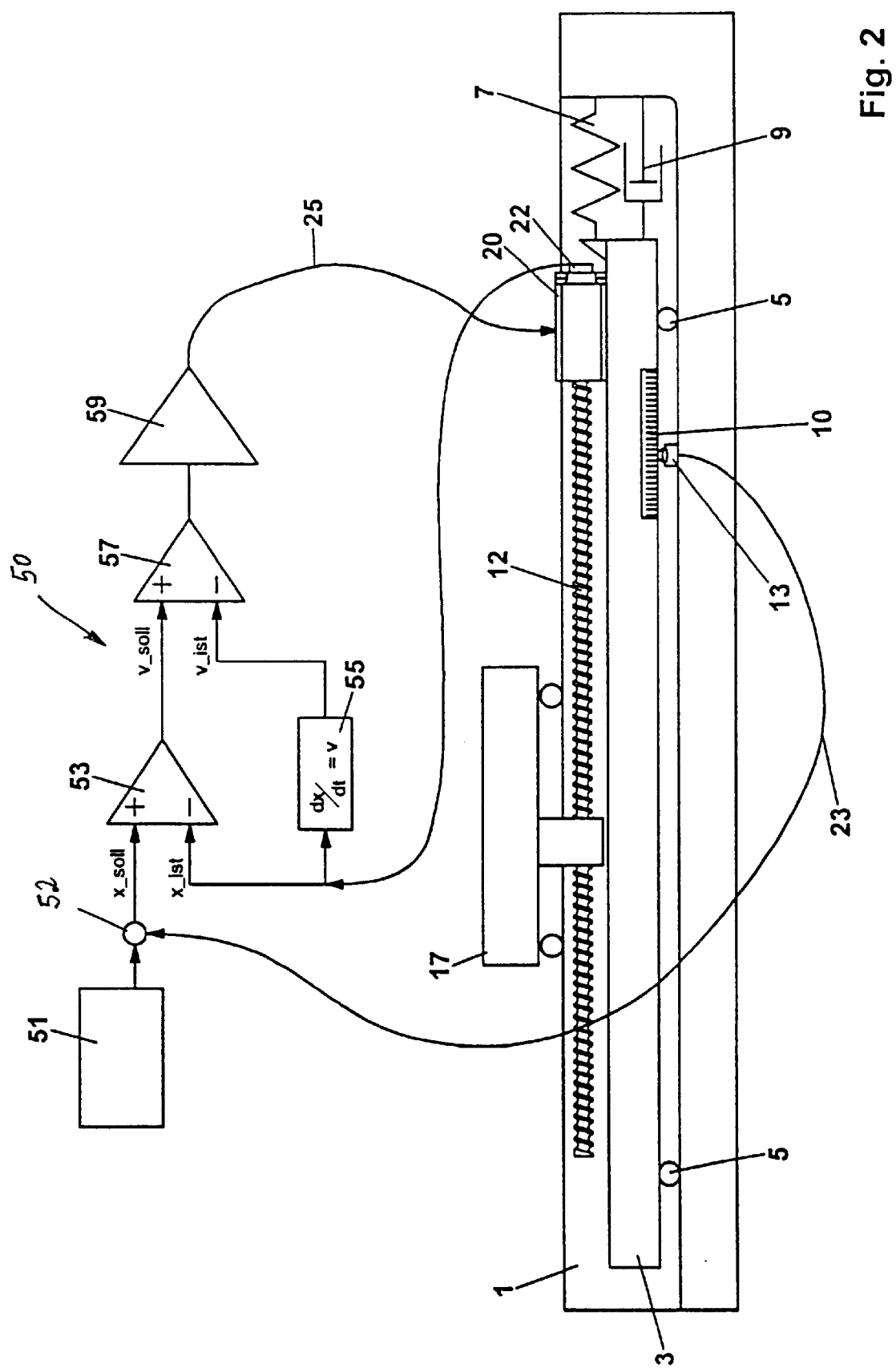
FIG. 2 shows a schematic illustration of a ball roller spindle drive with a reaction carriage, embodying the present invention.

Alternatively, as shown in FIG. 2, the servo motor 20 can be located on the elastically suspended reaction carriage 3 and can together with the reaction carriage 3 perform a compensating motion relative to the machine base 1. In this exemplary arrangement, the drive train has a ball roller spindle.

In another embodiment (not shown), the drive train can also have the form of a toothed belt drive. In this case, the drive roller and idler roller have to be mounted together on the reaction carriage 3.

In both of the aforedescribed embodiments, the position of the machine carriage 17 relative to the reaction carriage 3 can be measured with respective angular encoders 21, 22 which are attached to the servo motor shaft. The relative position between the machine carriage 17 and the reaction carriage 3 can be determined by converting the rotation angle into a linear displacement by taking into account the mechanical gear ratio of the transmission. If a greater positioning accuracy is required, then an additional linear ruler (not shown) can be placed between the reaction carriage 3 and the machine carriage 17.

If the suspension and the characteristic dynamics of the reaction carriage are well-defined and time-invariant, then the characteristics of the controller can be adapted to the transfer function of the reaction carriage 3, and the torque of the servo motor can be adjusted so as to facilitate damping of the reaction carriage.

Advantageously, the correction signal 23 which is derived from the correction ruler 10 and measures the displacement of the reaction carriage 3 relative to the machine base 1, cannot only be used to correct the position set points, but also to correct the values for the actual position. The velocity and the acceleration can also be derived from the correction signal. The dynamic correction values calculated in this way can be introduced into the control circuit at a suitable location. A suitable approach for evaluating the additional dynamic information of the system is generally known in the art under the name "pilot control" and "status control".

As indicated in FIGS. 1 and 2 with reference to the control system 50, a setpoint value for the machine carriage 17 relative to the machine base 1 is defined in setpoint controller 51. The correction signal 23 representing a displacement between the reaction carriage 3 and the machine base 1 is added to (or subtracted from) the setpoint value in adder 52, thus providing a corrected setpoint value x_soll. The actual position x_ist of the machine carriage 17 relative to the reaction carriage 3 is measured by encoder 21 and subtracted from the corrected setpoint value in differential amplifier 53, forming a differentiated velocity setpoint signal v_soll. The position of the reaction carriage 3 does not enter the determination of v_soll. Likewise, the velocity v_ist of the machine carriage 17 relative to the reaction carriage 3 is measured by differentiating the signal from encoder 21 in differentiator 55. v_ist is then subtracted from v_soll in a second difference amplifier stage 57 and a control signal 25 is fed back by an output stage 59 to the motor 19 and 20, respectively, to make the difference (v_ist−v_soil) equal to zero.

The status control can be used to process the information derived from the correction ruler 10 which indicates the displacement between the reaction carriage 3 and the machine base 1. Alternatively or in addition, an additional linear ruler 100 can be installed to measure the position between the machine base 1 and the machine carriage 17 directly. This direct position measurement system can determine the correction signals and the correction ruler 10 be eliminated entirely by employing a suitable control strategy and fast signal processing to sufficiently dampen the reaction carriage 3. All these approaches, however, have in common that the speed control circuit which is depicted in FIGS. 1 and 2 incorporate in the control system 50 the second difference amplifier stage 57 which derives the actual speed signal from the rotary encoders 21, 22 disposed on the motor shaft.

Attaching additional guide elements for supporting a reaction carriage can be quite complex. Alternatively, the reaction carriage can be placed on top of deformable mechanical elements which allow the reaction carriage to move. Suitable support elements 5 can, for example, be in the form of tongues made of metal strips.

While the invention has been illustrated and described as embodied in a momentum-decoupled drive train, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A method for controlling the position of a useful load actuated by a momentum-decoupled drive assembly having a drive train with at least one first drive element and at least one second drive element, said first drive element associated with a machine carriage supporting the useful load, and said second drive element associated with a reaction carriage moveably supported on a machine base, the method comprising:

defining a setpoint value for a position of the machine carriage relative to a machine base, adding a correction signal representing a displacement between the reaction carriage and the machine base to the setpoint value, thus providing a corrected setpoint value, measuring an actual position value of the machine carriage relative to the reaction carriage, subtracting the actual position value from the corrected setpoint value, thereby forming a differentiated velocity setpoint signal, measuring the velocity of the machine carriage relative to the reaction carriage by differentiating the actual position value, subtracting the velocity of the machine carriage from the differentiated velocity setpoint signal, and feeding back a control signal to a motor that controls the position of a useful load to make the difference between the velocity of the machine carriage and the differentiated velocity setpoint signal equal to zero.

2. The method of claim 1, wherein the actual position value is measured using an angular encoder of a servo motor.

3. The method of claim 1, wherein the reaction carriage is resiliently supported on the machine base for movement in a linear direction and wherein a characteristic frequency of the reaction carriage when oscillating in the linear direction is smaller than a control frequency of the control signal to the motor.

4. The method of claim 1, wherein the characteristic frequency is less than approximately 400 Hz.

5. The method of claim 1, wherein the characteristic frequency is less than 100 Hz.

6. The method of claim 1, wherein the characteristic frequency is less than 30 Hz.

7. The method of claim 1, wherein the drive train is selected from the group consisting of a pinion and a toothed rod, a spindle and a spindle nut, a belt pulley and a drive belt, and a pinion and a drive chain.

* * * * *